United States Patent [19]
Ai et al.

[11] Patent Number: 5,321,497
[45] Date of Patent: Jun. 14, 1994

[54] INTERFEROMETRIC INTEGRATION TECHNIQUE AND APPARATUS TO CONFINE $2\pi$ DISCONTINUITY

[75] Inventors: Chiayu Ai; Yiping Xu, both of Tucson, Ariz.

[73] Assignee: Wyko Corporation, Tucson, Ariz.

[21] Appl. No.: 848,309

[22] Filed: Mar. 9, 1992

[51] Int. Cl.⁵ .............................................. G01B 11/00
[52] U.S. Cl. ........................... 356/359; 356/347; 356/360; 356/353; 364/525; 364/566; 382/41; 382/42; 382/44; 382/54
[58] Field of Search ............... 356/359, 347, 360, 353; 364/525, 550, 562, 566, 576; 382/43, 41, 42, 44, 54

[56] References Cited

U.S. PATENT DOCUMENTS

| | | | |
|---|---|---|---|
| 4,692,027 | 9/1987 | MacGovern et al. | 356/353 |
| 4,697,927 | 10/1987 | Ono | 356/360 |
| 4,768,881 | 9/1988 | Jüptner et al. | 356/347 |
| 4,791,584 | 12/1988 | Greivenkamp, Jr. | 364/525 |
| 4,794,550 | 12/1988 | Greivenkamp, Jr. | 364/562 |
| 4,832,489 | 5/1989 | Wyant et al. | 356/359 |
| 5,018,861 | 5/1991 | Remo | 356/353 |
| 5,133,601 | 7/1992 | Cohen et al. | 356/359 |

Primary Examiner—Samuel A. Turner
Assistant Examiner—LaCharles Keesee
Attorney, Agent, or Firm—Charles R. Hoffman

[57] ABSTRACT

A method and system are described for performing phase unwrapping integrations in a phase-shifting interferometric profiling operation. The disclosed technique uses one characteristic of modulation or slope distributions to segment the modulation or slope histogram into a plurality of sections. The principal phase values are divided into a plurality of groups in accordance with corresponding modulation or slope histogram sections. The phase unwrapping integrations are performed in such an order that the areas with a high probability of containing a $2\pi$ discontinuity are contained in the last group integrated. Thus, inaccuracies due to $2\pi$ discontinuities do not "propagate" to earlier-computed phase values computed by the phase unwrapping algorithm.

26 Claims, 4 Drawing Sheets

INTERFEROMETRIC INTEGRATION TECHNIQUE AND APPARATUS TO CONFINE 2π DISCONTINUITY

BACKGROUND OF THE INVENTION

The invention relates to interferometers for profiling a test surface, and particularly to an interferometric integration technique that avoids propagation of phase errors due to 2π discontinuities occurring in small areas of the test surface to the other areas thereof.

By way of background, so-called phase-shifting interferometry techniques are utilized by optical interferometers to compute the phase of the interference pattern produced by shifting the optical path difference (OPD) between a reference surface and a surface being tested.

In phase-shifting interferometry, the phase distribution across the interferogram is measured "modulo 2π". In other words, the measured phase distribution will contain 2π discontinuities which can only be eliminated as long as the slope of the wavefront being measured is small enough that the phase difference is less than π between adjacent pixels of the detector array. If the latter condition is met, the phase discontinuities can be removed by adding or subtracting 2π to the measured phase so that the resulting phase difference between adjacent pixels is always less than π. The phase difference referred to, which must be less than π between adjacent detector pixels, includes phase errors caused by electronic noise. Electronic noise includes "computational noise" due to the limited number of binary bits used to make the phase calculations according to the phase-shifting interferometric techniques utilized. Numerous phase-shifting interferometry techniques and apparatus are known, for example, as described in U.S. Pat. No. 4,639,139 issued Jan. 27, 1987 by Wyant et al. entitled "Optical Profiler Using Improved Phase-Shifting Interferometry", incorporated herein by reference.

It frequently is desirable to be able to test a rough surface having portions so steep that the measured phase difference between adjacent pixels (including phase difference due to the effects of electronic computational noise) is greater than π. In this case the 2π ambiguities cannot be eliminated by simple addition or subtraction of 2π to the "measured" phase. Conventional so-called "phase unwrapping techniques", wherein the values computed modulo 2π are matched by adding or subtracting multiples of 2π so as to make the "unwrapped" phase continuous, are not useable on such steep portions of the surface being profiled. The sequential nature of known phase unwrapping techniques has the consequence that if an error is introduced into the phase by misjudging the number of multiples of 2π added or subtracted to the integrated phase, that error "propagates" to all subsequently integrated values of phase, and hence to the corresponding surface profile heights of the surface being tested. Thus, 2π discontinuities exist in the integrated surface profile. (In some cases, other methods, such as the two-wavelength technique of U.S. Pat. No. 4,832,489 (Wyant et al.) or the sub-Nyquist method described in U.S. Pat. No. 4,791,584 (Greivenkamp, Jr.) can be used to eliminate 2π discontinuities.) As a practical matter, the computed and displayed surface profile of a surface with steep portions generally is much less accurate than is desired.

There is an unmet need for a single-wavelength technique to prevent propagation of errors introduced at locations of 2π discontinuities on a surface from being included in or "propagating to" all subsequent phase calculations for the remaining area of the surface.

SUMMARY OF THE INVENTION

Accordingly, it is an object of the invention to provide an improved technique for avoiding inclusion of errors caused by 2π discontinuities at one location of a test surface in values of phase subsequently computed for remaining areas of the test surface.

It is another object of the invention to provide an improved technique for applying phase-shifting technology to measurement of a rough surface.

Briefly described, and in accordance with one embodiment thereof, the invention provides a method and system of performing phase unwrapping integrations in a phase-shifting interferometric profiling operation, wherein for each pixel of an interferogram image of a test surface a plurality of intensities are measured for a plurality of optical path differences. A modulation value is computed for each pixel from the intensities, and a principal phase value is computed for each pixel from the intensities. The modulation histogram is computed by accumulating the pixels of the same modulation value. Then a histogram of the modulation data is computed and segmented into "sections". These sections are designated with index numbers according to the upper and lower bounds of the modulation values of the section. The principal phase values are divided into a plurality of "groups". Each "group" corresponds to a "section" of the modulation histogram, and is assigned an integration order number in accordance with the corresponding modulation index number of the "section".

In another embodiment, "slopes" are determined from principal phase value differences between each pixel and a neighboring pixel. A "slope" histogram is computed and the histogram is segmented into sections using the similar procedure described above for the modulation histogram. Each section is also assigned an index number. The lowest index number is assigned to the section with the smallest slope values. This section consists of the majority of the valid pixels, and usually contains the mean of the slope values. The other sections are then properly designated with higher index numbers. The principal phase values are divided into a plurality of groups of the test surface in accordance with corresponding slope values. The principal phase values of the pixels whose slope values belong to the same section of the slope histogram are designated into one group. Therefore, a group of the principal phase values corresponds to a section in the slope histogram. Each group is assigned an integration order number which is equal to the slope index number of the corresponding section in the slope histogram. A group may consist of one area or several non-contiguous areas. The principal phase values are integrated according to the increasing integration order numbers to unwrap the principal phase values and confine 2π discontinuity errors to the final region of the test surface in which the integrating is performed.

DETAILED DESCRIPTION OF THE PREFERRED EMBODIMENT

Figure 1:
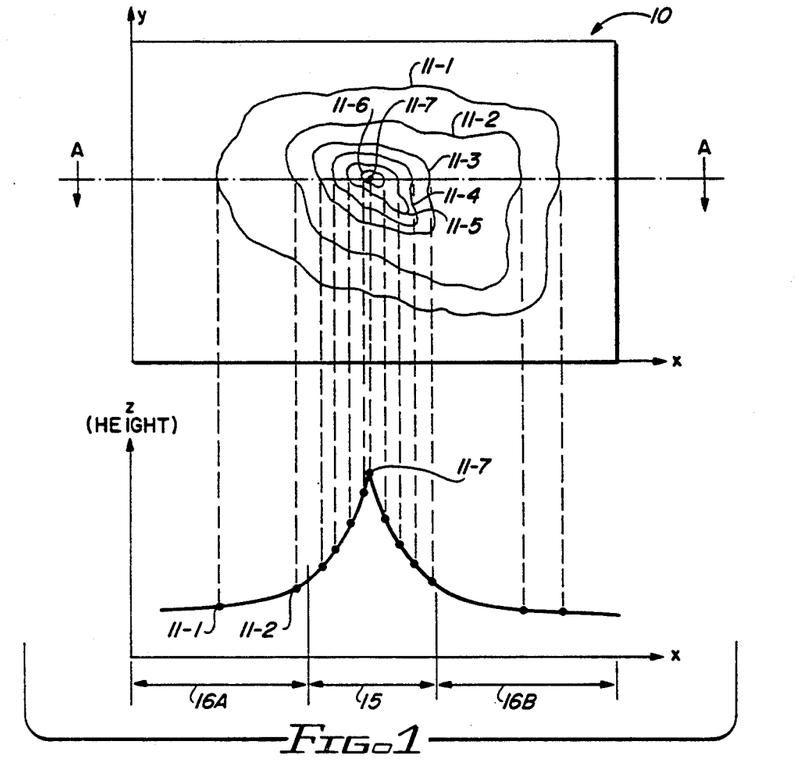
FIG. 1 is a plan view of a test surface and is useful in describing a technique for grouping integration areas of a test surface in accordance with modulation levels to confine errors due to 2π discontinuities to the last area to be integrated, and also include a section view taken across section line 1A—1A.

The present invention provides a new way of dealing with difficulties in resolving or "unwrapping" principal phase values ($\phi$) using phase shifting techniques to avoid inclusion or "propagation" of $2\pi$ discontinuity errors occurring at locations of steep surfaces of the sample surface. In FIG. 1, numeral 10 designates a portion of an area of a test surface being profiled. Curves 11-1, 11-2, . . . 11-7 represent different lines of equal height or equal phase of the surface, the highest point being represented by point 11-7. Lines 11-1, 11-2, . . . 11-6 represent lower heights of the surface being profiled. FIG. 1 also illustrates the test surface profile along section line 1A—1A, at the intersections of the equal-height lines 11-1 . . . 11-7.

The steepness of the profile height z between the lines designated by arrow 15 is such that the differences of the phase values between two adjacent pixels greater than $\pi$ are much more likely to occur than in region indicated by arrows 16A and 16B and result in $2\pi$ discontinuities.

Figure 2:
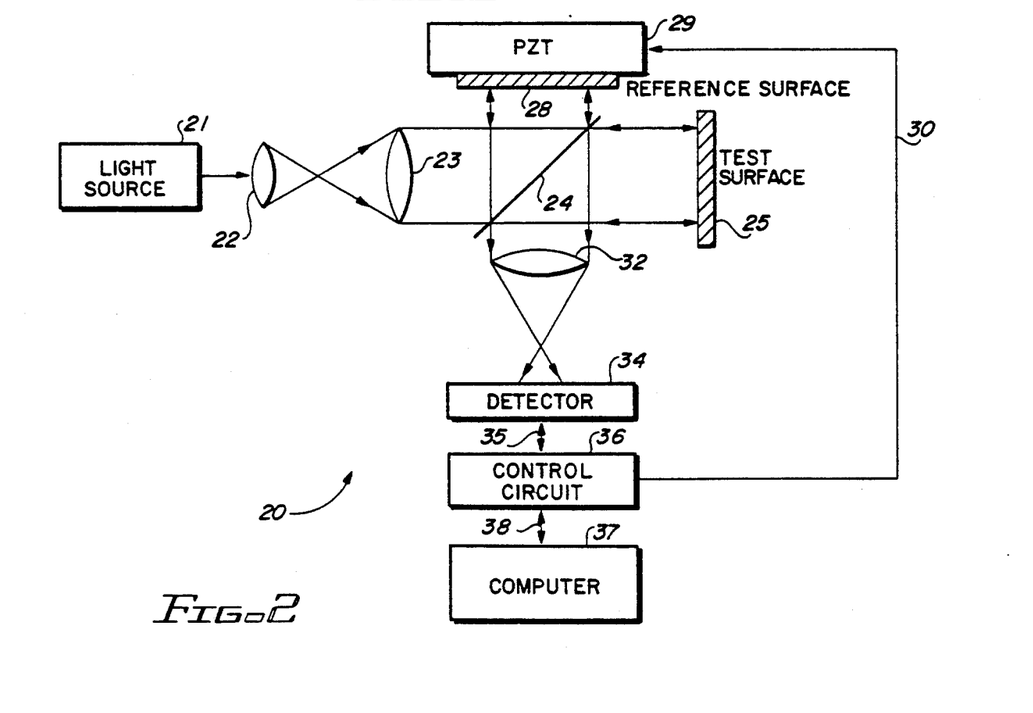
FIG. 2 is a diagram of the apparatus utilized in conjunction with the present invention.

Referring to FIG. 2, automatic interferometer system 20 includes a light source 21, which can be a laser or a white light source, that generates a beam directed by lens 22 and lens 23 onto a beamsplitter 24. Part of the light passes through beamsplitter 24 to test surface 25 and is reflected back to beamsplitter 24 through imaging lens 32 onto the surface of a photodetector array 34. Another part of the light from light source 21 is reflected by beamsplitter 24 upward to the reference surface 28 and reflected back through beamsplitter 24 and imaging lens 32 to produce an interferogram with the "test beam" from test surface 25. The interferogram is detected by photodetector 34, which produces electronic signals representing the light intensity for each pixel. The intensity data is fed into control circuit 36, which produces digital intensity data that is fed to computer 37 via bus 38. Computer 37 also causes control circuitry 36 to apply control signals to piezoelectric transducer (PZT) 29 via bus 30 to effectuate a suitable phase-shifting measurement technique to collect the needed intensity data to compute the phases of all pixels of photodetector 34, in accordance with various well-known techniques. The assignee's TOPO interferometer is one commercially available device that implements the system shown in FIG. 2, except for the phase unwrapping technique of the present invention incorporated in computer 37.

In accordance with the present invention, it has been recognized that the modulation or contrast of the intensity of the interferogram produced on the surface of photodetector 34 of FIG. 2 by the interference between the test beam and the reference beam at every pixel of the field of view of surface area 10 is considerably lower in the steep section 15 than in the relatively flat areas 16A and 16B around steep section 15.

In order to prevent $2\pi$ discontinuity errors from accumulating in the unwrapped or integrated phase values for most of the test surface area in which $2\pi$ discontinuity errors are unlikely, the modulation is computed at every pixel. What is meant by "unwrapped" or "integrated" phase values are the resultant phase values obtained by performing various well known integrating procedures, which resultant phase values can be directly converted by simple computation into a smooth continuous surface profile of the test surface. The modulation histogram is segmented into a plurality of sections each containing a range of modulation values, in accordance with the criteria of the mean and the standard deviation of the modulation values. Each section is assigned an index number. The lowest index number is assigned to the section which consists of the majority of the valid pixels. This section usually contains the mean of the modulation values. The other sections are then properly designated with higher index numbers according to each section's property such as the number of pixels in the section, or the upper and the lower bounds of the modulation values of the section. The principal phase values for the test surface are divided into a plurality of groups in accordance with corresponding modulation values. The principal phase values of the pixels whose modulation values belong to the same section of the modulation histogram are designated into one group. Therefore, a group of the principal phase values corresponds to a section in the modulation histogram. Each group is assigned an integration order number which is equal to the modulation index number of the corresponding "section" in the modulation histogram. A "group" may consist of one area or several non-contiguous areas. The principal phase values are integrated according to the increasing integration order numbers to unwrap the principal phase values and confine $2\pi$ discontinuity errors to the final region of the test surface in which the integrating is performed.

Then, phase values are computed in accordance with the phase unwrapping algorithm, beginning with the areas of lowest integration order number. In this manner, phase unwrapping integrations are performed sequentially toward the two extremes of modulation so that the phase unwrapping integrations are performed last in the test surface area including point 11-7, which has the highest likelihood of occurrence of a $2\pi$ discontinuity.

Most of the phase data (and hence the surface height data) therefore is computed first over the smoothest parts of the surface, so that the computed and displayed surface profile is very accurate. Thus, inaccuracies due to $2\pi$ discontinuities are confined to the smallest, steepest areas of the surface and do not "propagate" to earlier-computed phase values computed by the phase unwrapping algorithm.

Figure 3:
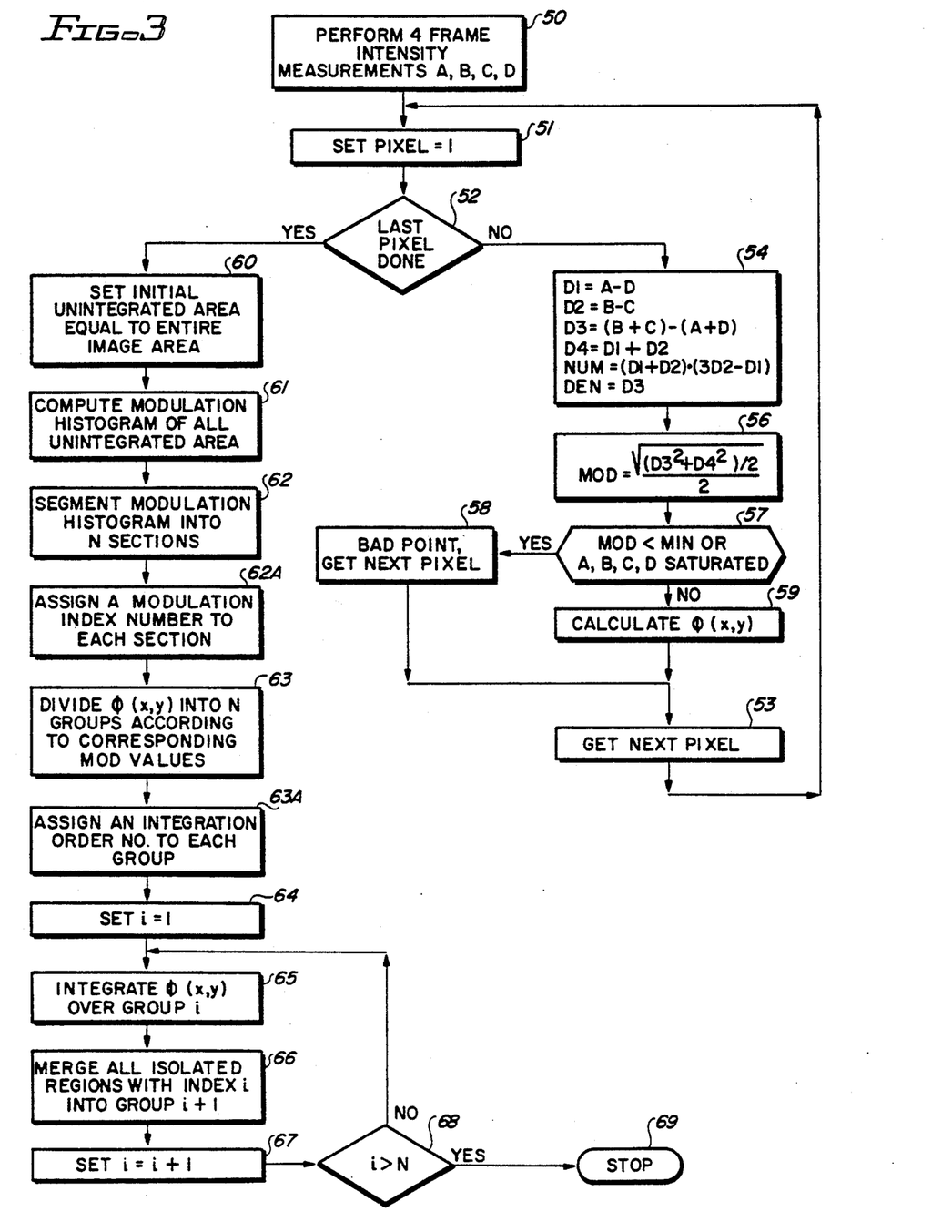
FIG. 3 is a flowchart of a program executed by the computer in the diagram of FIG. 2 to effectuate the present invention.

A computer program used to perform the phase unwrapping integration algorithm or technique of the present invention is described with reference to the flowchart of FIG. 3. As indicated in block 50 of FIG. 3, all of the intensity data is gathered first for the entire photodetector array using a known phase-shifting technique, to obtain four intensity measurements A, B, C, and D at four phases, respectively, for each pixel. (For simplicity, the equations indicated in FIG. 3 are shown for accumulation of only four frames of intensity measurements, whereas the TOPO interferometer with which the invention is presently implemented, collects more than four frames of intensity data for increased accuracy.) For example, the phase-shifting technique described in above-mentioned U.S. Pat. No. 4,639,139 can be used.

As indicated in block 51, a software variable called PIXEL, representing the present pixel being scanned, is initialized to the first pixel. In accordance with decision block 52, the program determines whether the presently scanned pixel is the last pixel. If it is, the program goes to block 60, subsequently described. If the present pixel is not the last pixel, the program goes to block 54 and computes the quantities D1-D4, NUM, and DEN in accordance with the following equations:

$$D_1 = A - D \quad (1)$$
$$D_2 = B - C \quad (2)$$
$$D_3 = (B + C) - (A + D) \quad (3)$$
$$D_4 = D_1 + D_2 \quad (4)$$
$$NUM = (D_1 + D_2)(3D_2 - D_1) \quad (5)$$
$$DEN = D_3. \quad (6)$$

The program then goes to block 56 and computes the modulation MOD for the present pixel in accordance with the equation $$MOD = \frac{\sqrt{(D_3)^2 + (D_4)^2/2}}{2} \quad (7)$$

The program then goes to decision block 57 and determines if the modulation MOD is less than a predetermined minimum threshold value or if any of the quantities A, B, C, or D indicates that the photodetector intensity data is "saturated". If any of the determinations of decision block 57 is affirmative, it means that the present pixel is a "bad" pixel and that accurate phase data cannot be obtained with the present apparatus. The program then goes to block 53 and increments PIXEL. If the determination of decision block 57 is negative, the program goes to block 59 and computes the principal phase value $\phi(x,y)$ in accordance with the equation:

$$\phi = \quad (8)$$
$$\arctan\left[\frac{\sqrt{[(A - D) + (B - C)][3(B - C) - (A - D)]}}{(B + C) - (A + D)}\right].$$

Figure 4:
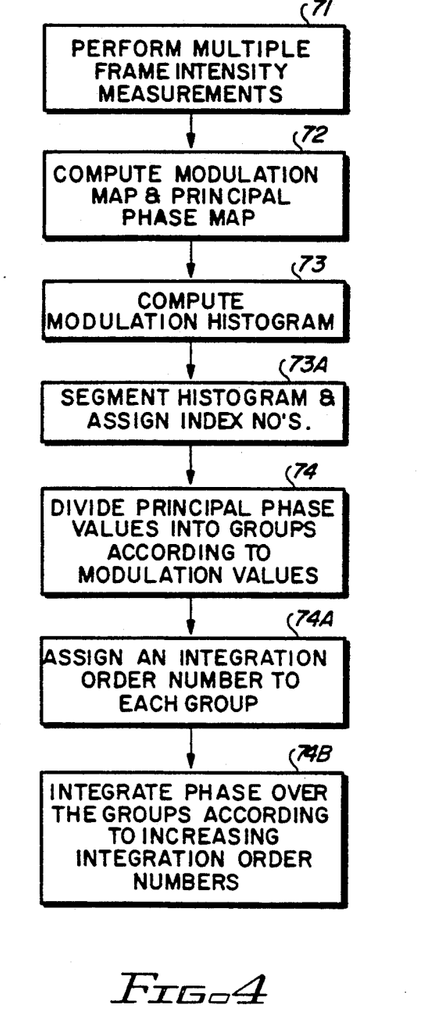
FIG. 4 is a flowchart useful in describing one aspect of the present invention using modulation values.

The computation of block 59 corresponds to blocks 74 through 87 of FIG. 4B of U.S. Pat. No. 4,832,489 mentioned above.

In block 60, the program initializes the "unintegrated area" of the field of view of the test surface to be the entire image area excluding the bad pixels defined in block 58.

In block 61, the program computes a modulation histogram for all "unintegrated" area of the image area. In block 62, the program segments the modulation histogram computed in block 61 into N "sections", where N is the number of different "bands" or sections into which the modulation has been subdivided. In block 62A, a modulation index number is assigned to each such section. The lowest index number is assigned to the section which consists of the majority of the valid pixels. This section usually contains the mean of the modulation values. The other sections are then properly designated with higher index numbers according to each section's property such as the number of pixels in the section, or the upper and the lower bounds of the modulation values of the section.

The program then goes to block 63 and divides the principal phase $\phi(x,y)$ into N "groups" according to the corresponding modulation values. The principal phase values of the pixels whose modulation values belong to the same section of the modulation histogram are designated into one group. Therefore, a group of the principal phase values corresponds to a section in the modulation histogram. Then the program goes to block 63A, in which each group of the principal phase values is assigned an integration order number equal to the corresponding modulation index number.

The program then goes to block 64, sets i=1, and then goes to block 65 and performs a phase integration of the area in the group the integration number of which is i to accomplish the first stage of phase unwrapping. The program then goes to block 66 and changes all isolated regions having the index i to group i+1. Block 66 applies when there are some "leftover" pixels of group i that are not contiguous with the area presently being integrated. Then those isolated regions are added to the next group or the i+1 group.

The program then goes to block 67 and increments i, and then goes to decision block 68 and determines if the phase has been integrated over all groups of the principal phase values. If that determination is affirmative, the phase unwrapping integration is complete, and the program exits at block 69, but otherwise reenters block 65.

It should be appreciated that as the integration proceeds to successively higher and higher values of i and hence over the areas with the more extreme values of modulation, these areas have increasingly greater likelihood of having a $2\pi$ discontinuity error. However, the smooth, low error probability regions all are integrated first, so that any $2\pi$ discontinuity errors introduced in last integrated steep portions of the test surface do not accumulate or "propagate" to earlier integrated areas of the test surface. The vast majority of the test surface therefore will be accurately profiled, except for the very steepest portions which occupy only a very small percentage of the test surface area.

FIG. 4 shows a simplified flowchart that illustrates the basic procedure of the invention, which is to first accumulate the intensities by conventional phase-shifting techniques as shown in block 71, and then compute a modulation map 72 in accordance with equation (7) and a principal phase map in accordance with equation (8). The next step is to compute a suitable histogram of the computed modulation as indicated in block 73, and then, as indicated in block 73A, to analyze the histogram by segmenting it into several sections and assigning a proper index number to each section. The program then goes to block 74 to divide the principal phase values $\phi(x,y)$ into the appropriate groups. Then the program goes to block 74A to assign each group an integration order number which is equal to the modulation index number of the corresponding sections. The phase unwrapping integrations of the principal phases then are performed successively in the groups according to the increasing integration order numbers, i.e., the order of increasing and decreasing modulation values toward the two extremes of the modulation values, as indicated in block 74B.

Figure 5:
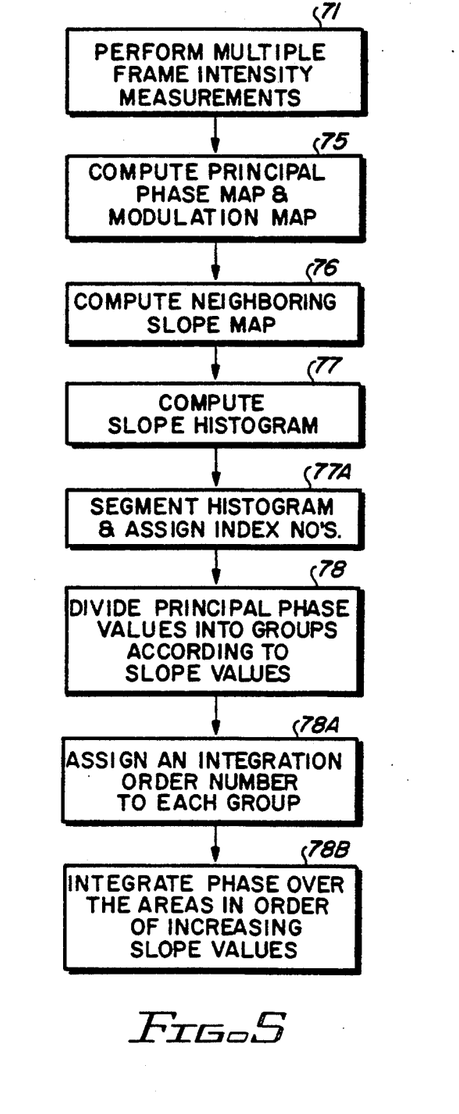
FIG. 5 is a simple flowchart useful in describing an alternate embodiment of the invention using "slopes" of the principal phase values.

FIG. 5 shows an alternative general approach in which the principal phases $\phi(x,y)$ and modulation values are all computed, as indicated in block 75, and then the "slopes" are determined from the differences in principal phase between each pixel and its neighboring pixels, as indicated in block 76. The histogram of "slopes" then is computed, as indicated in block 77. In block 77A, the histogram is segmented into several sections, including a first section including all pixels having slope values which are between the smallest slope value of the slope histogram and an upper standard deviation limit of the slope histogram, and a second section including all pixels having slope values which are above the upper standard deviation limit, wherein the second section is further segmented into first and second subsections, the first subsection including all pixels having slope values which are less than a standard deviation limit of the pixels in the second section, the second subsection including all pixels having slope values which are greater than the standard deviation limit of the pixels in the second section. Each section is assigned a proper index number. The program goes to block 78 to divide the principal phase values into several groups, as described earlier. The program goes to block 78A to assign each group an integration order number which is equal to the slope index number of the corresponding sections. The phase unwrapping integration is performed successively in the groups according to the increasing integration order numbers, i.e., the order of increasing slope values as indicated in block 78B, so that the $2\pi$ discontinuity errors are introduced into the integrated or "unwrapped" phase only at the end of the integrating process.

Experimental results show that for a given modulation value range, if the corresponding section in the modulation histogram has fewer pixels, these pixels are more likely to have errors. Those sections tend to be in the two extremes of the modulation value. The technique of FIG. 4 divides principal phase values into groups and assigns the integration order numbers to the groups according to increasing and decreasing the modulation values toward the two extremes of modulation values. This results in more accurate profiling of rough surfaces with steep surface areas. However, for smooth surfaces, the approaches of both FIG. 4 and FIG. 5 work quite well.

Figure 6A:
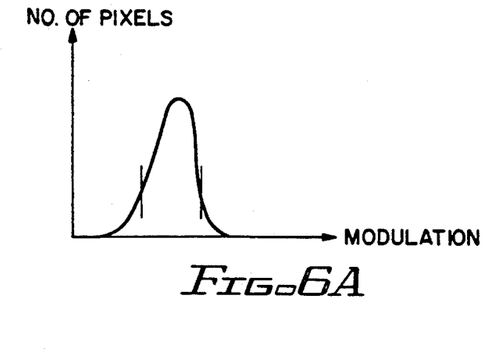
FIGS. 6A and 6B show hypothetical histograms of computed modulation and computed "slope" of the principal phase values used in the phase unwrapping techniques of FIGS. 4 and 5, respectively, for a smooth test surface.
Figure 6B:
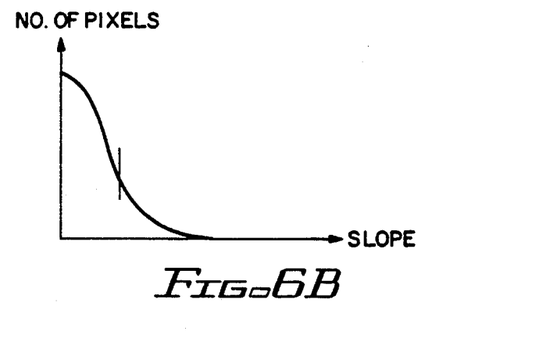
Figure 7A:
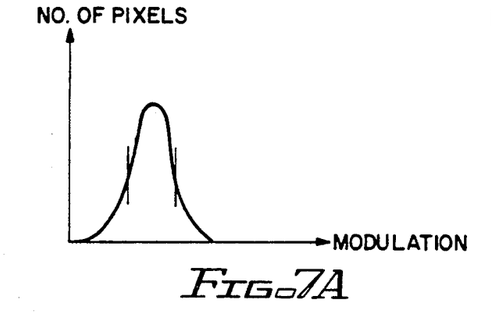
FIGS. 7A and 7B show hypothetical histograms of computed modulation and computed "slope" of the principal phase values used in the phase unwrapping techniques of FIGS. 4 and 5, respectively, for a rough test surface.
Figure 7B:
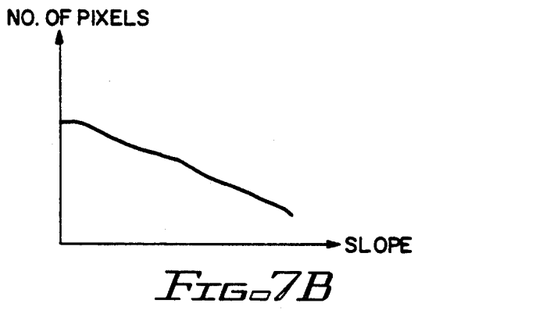

FIGS. 6A and 6B show hypothetical histograms of computed modulation and computed "slope", respectively, for a relatively smooth surface. It can be seen from these curves that most of the modulation values and most of the "slope" values occur within easily identifiable bands of the histograms, such as bands defined by statistical parameters, for instance the mean and standard deviation. For a rough surface, the graph shown in FIG. 7A shows a histogram for modulation, and FIG. 7B shows a histogram for "slope". Again, most of the pixels have a similar modulation value. This results in a cluster that occurs within the easily identified section of the histogram. Thus, the histogram can be easily segmented into sections. The main section contains most of the pixels. However, if the "slope" computation is used, a histogram such as the one shown in FIG. 7B is obtained, and it is very difficult to identify a safe "band" of the histogram including most of the test surface area.

Figure 8:
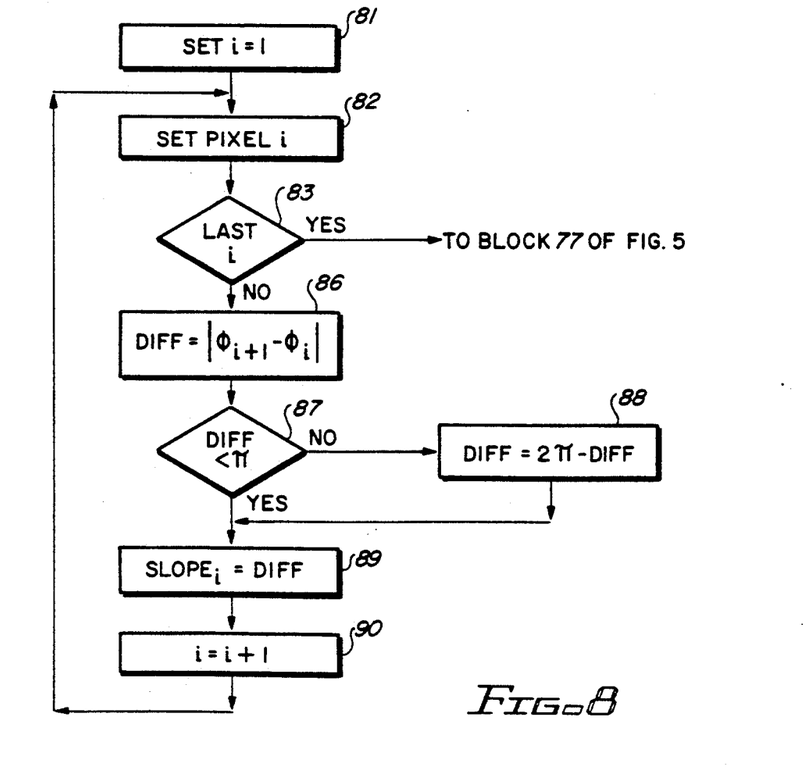
FIG. 8 is a flowchart useful in describing the method illustrated in FIG. 5.

Referring to FIG. 8, the first step in computing the "slope" of the principal phase value between the ith pixel and its neighboring i+1th pixel is to initialize i, which represents an initial pixel scan, as indicated in block 81. The program then goes to block 82 and starts with that ith pixel, and determines in decision block 83 if the present pixel is the last pixel. If this determination is negative, the program goes to block 86 and computes the magnitude (MAG) of the principal phase value difference according to the formula DIFF=MAG($\phi_{i+1}-\phi_i$), and then goes to decision block 87. In block 87 the program determines if DIFF is less than $\pi$. If this determination is affirmative, DIFF represents the "slope" between the ith pixel and its neighbor the i+1th pixel. If the determination of block 87 is negative, the subroutine goes to block 88 and computes DIFF=$2\pi$-DIFF. Those skilled in the art will recognize that this involves a shift of $2\pi$ to correct DIFF because of the modulo $2\pi$ nature of the phase equation. In either case, the program then goes to block 89 and sets "SLOPE$_i$" to DIFF, and goes to block 90 and increments i.

If the determination of decision block 83 is affirmative, all of the values of "SLOPE" have been computed. The program then goes to blocks 77 and 78 of FIG. 5 and computes the "SLOPE" histogram and groups the computed phase $\phi(x,y)$ in accordance with the "SLOPE" histogram.

Thus, the basic concept of the invention is to use the characteristic of the modulation or slope distribution to regroup the principal phase values over which the $\phi(x,y)$ phase unwrapping integrations are performed in such an order that the areas with a high probability of containing a $2\pi$ discontinuity are contained in the last group integrated. This is in contrast to all known prior phase unwrapping integration techniques, which perform the integration according to a predetermined sequence that bears no relationship to the locations of steep portions of the surface being profiled.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method of operating an interferometer system to perform phase unwrapping integrations to accurately measure a profile of a test surface, the method comprising the steps of:

(a) supporting the test surface in the interferometer system;

(b) for each pixel of an interferogram image of the test surface, measuring a plurality of intensities for each of a plurality of optical path differences;

(c) computing a modulation value for each pixel from the intensities;

(d) computing a principal phase value for each pixel from the intensities;

(e) computing a modulation histogram by accumulating pixels having the same modulation value ranges;

(f) separating the modulation histogram into a plurality of sections including one section having substantially more pixels than any other section;

(g) separating the principal phase values into a plurality of groups corresponding to the plurality of the modulation histogram sections, respectively; and (h) integrating the principal phase values in the groups to unwrap the principal phase values to thereby produce phase information which represents the profile of the test surface, (i) the integrating being performed on the principal phase values in the order of groups with decreasing numbers of associated pixels, to thereby confine $2\pi$ discontinuity errors to the final region of the test surface in which the integrating is performed.

2. The method of claim 1 wherein step (f) includes assigning modulation index numbers to each section in the order of decreasing numbers of pixels therein.

3. The method of claim 2 wherein step (g) includes assigning integration order numbers to the groups equal to the modulation index numbers of the sections corresponding to such groups, respectively.

4. The method of claim 3 wherein step (h) includes integrating the principal phase values in the groups in the order of increasing integration order numbers thereof.

5. The method of claim 4 wherein the integrating of the principal phase values in a group includes integrating only principal phase values of pixels in a non-isolated area of the test surface, pixels of that group lying in isolated areas of the test surface being merged with pixels in a group having the next higher integration order number.

6. The method of claim 1 wherein step (f) includes separating the modulation histogram into a first section including all pixels having modulation values which are between an upper standard deviation limit and a lower standard deviation limit of the modulation histogram, the second section including all pixels having modulation values which are above the upper standard deviation limit, and a third section including all pixels having modulation values which are below the lower standard deviation limit.

7. The method of claim 1 wherein step (c) includes eliminating pixels having saturated intensity values or modulation values less than a predetermined minimum threshold value.

8. A system for performing phase unwrapping integrations in a phase-shifting interferometer, comprising in combination:

(a) a test surface supported in the interferometer;

(b) means for measuring a plurality of intensities for each pixel of an interferogram image of the test surface, for each of a plurality of optical path differences;

(c) means for computing a modulation value for each pixel from the intensities;

(d) means for computing a principal phase value for each pixel from the intensities;

(e) means for computing a modulation histogram by accumulating pixels having the same modulation value ranges;

(f) means for separating the modulation histogram into a plurality of sections including one section having substantially more pixels than any other section;

(g) means for separating the principal phase values into a plurality of groups corresponding to the plurality of the modulation histogram sections, respectively; and (h) means for integrating the principal phase values in the groups to unwrap the principal phase values to thereby produce phase information which represents the profile of the test surface, (i) the integrating being performed on the principal phase values in the order of groups with decreasing numbers of associated pixels, to thereby confine $2\pi$ discontinuity errors to the final region of the test surface in which the integrating is performed.

9. The system of claim 8 including means for assigning modulation index numbers to each section in the order of decreasing numbers of pixels therein.

10. The system of claim 9 including means for assigning integration order numbers to the groups equal to the modulation index numbers of the sections corresponding to such groups, respectively.

11. The system of claim 10 including means for integrating the principal phase values in the groups in the order of increasing integration order numbers thereof.

12. The system of claim 11 wherein the integrating means includes means for integrating only principal phase values of pixels in a non-isolated area of the test surface, pixels of that group lying in isolated areas of the test surface being merged with pixels in a group having the next higher integration order number.

13. The system of claim 8 including means for separating the modulation histogram into a first section including all pixels having modulation values which are between an upper standard deviation limit and a lower standard deviation limit of the modulation histogram, the second section including all pixels having modulation values which are above the upper standard deviation limit, and a third section including all pixels having modulation values which are below the lower standard deviation limit.

14. The system of claim 8 including means for eliminating pixels having saturated intensity values or modulation values less than a predetermined minimum threshold value.

15. A method of operating an interferometer system to perform phase unwrapping integrations to accurately measure a profile of a test surface, the method comprising the steps of:

(a) supporting the test surface in the interferometer system;

(b) for each pixel of an interferogram image of the test surface, measuring a plurality of intensities for each of a plurality of optical path differences;

(c) computing a principal phase value for each pixel from the intensities;

(d) computing a slope for each pixel by computing a difference of the principal phase values between each pixel and a neighboring pixel;

(e) computing a slope histogram by accumulating the pixels of the same slope value;

(f) separating the slope histogram into a plurality of sections including one section having substantially more pixels than any other section;

(g) separating the principal phase values into a plurality of groups corresponding to the plurality of the slope histogram sections, respectively; and (h) integrating the principal phase values in the groups to unwrap the principal phase values to thereby produce phase information which represents the profile of the test surface, (i) the integrating being performed on the principal phase values in the order of groups with decreasing numbers of associated pixels, to thereby confine $2\pi$ discontinuity errors to the final region of the test surface in which the integrating is performed.

16. The method of claim 15 wherein step (f) includes assigning slope index numbers to each section in the order of decreasing numbers of pixels therein.

17. The method of claim 16 wherein step (g) includes assigning integration order numbers to the groups equal to the slope index numbers of the sections corresponding to such groups, respectively.

18. The method of claim 17 wherein step (h) includes integrating the principal phase values in the groups in the order of increasing integration order numbers thereof.

19. The method of claim 18 wherein the integrating of the principal phase values in a group includes integrating only principal phase values of pixels in a non-isolated area of the test surface, pixels of that group lying in isolated areas of the test surface being merged with pixels in a group having the next higher integration order number.

20. The method of claim 15 wherein step (f) includes separating the slope histogram into a first section including all pixels having slope values which are between the smallest slope value of the histogram and an upper standard deviation limit of the slope histogram, and a second section including all pixels having slope values which are above the upper standard deviation limit, wherein the second section is further segmented into first and second subsections, the first subsection including all pixels having slope values which are less than a standard deviation limit of the pixels in the second section, the second subsection including all pixels having slope values which are greater than the standard deviation limit of the pixels in the second section.

21. A system for performing phase unwrapping integrations in a phase-shifting interferometer, comprising in combination:

(a) a test surface supported in the interferometer;

(b) means for measuring a plurality of intensities for each pixel of an interferogram image of a test surface, for each of a plurality of optical path differences;

(c) means for computing a modulation value for each pixel from the intensities;

(d) means for computing a principal phase value for each pixel from the intensities;

(e) means for computing a slope from the difference of the principal phase values between each pixel and a neighboring pixel;

(f) means for computing a slope histogram by accumulating the pixels of the same slope value;

(g) means for separating the slope histogram into a plurality of sections including one section having substantially more pixels than any other section;

(h) means for separating the principal phase values into a plurality of groups corresponding to the plurality of the slope histogram sections, respectively; and (i) means for integrating the principal phase values in the groups to unwrap the principal phase values to thereby produce phase information which represents the profile of the test surface, (j) the integrating being performed on the principal phase values in the order of groups with decreasing numbers of associated pixels, to thereby confine $2\pi$ discontinuity errors to the final region of the test surface in which the integrating is performed.

22. The system of claim 21 including means for assigning slope index numbers to each section in order of decreasing numbers of pixels therein.

23. The system of claim 22 including means for assigning integration order numbers to the groups equal to the slope index numbers of the sections corresponding to such groups, respectively.

24. The system of claim 23 including means for integrating the principal phase values in the groups in the order of increasing integration order numbers thereof.

25. The system of claim 24 wherein the integrating means includes means for integrating only principal phase values of pixels in a non-isolated area of the test surface, pixels of that group lying in isolated areas of the test surface being merged with pixels in a group having the next higher integration order number.

26. The system of claim 21 including means for separating the slope histogram into a first section including all pixels having slope values which are between the smallest slope value of the histogram and an upper standard deviation limit of the slope histogram, and a second section including all pixels having slope values which are above the upper standard deviation limit, wherein the second section is further segmented into first and second subsections, the first subsection including all pixels having slope values which are less than a standard deviation limit of the pixels in the second section, the second subsection including all pixels having slope values which are greater than the standard deviation limit of the pixels in the second section.

* * * * *